United States Patent
Hatagishi et al.

(10) Patent No.: US 11,557,972 B2
(45) Date of Patent: Jan. 17, 2023

(54) POWER CONVERSION DEVICE

(71) Applicant: DIAMOND&ZEBRA ELECTRIC MFG. CO., LTD., Osaka (JP)

(72) Inventors: Yukihiro Hatagishi, Osaka (JP); Shinnosuke Takenaka, Osaka (JP)

(73) Assignee: DIAMOND&ZEBRA ELECTRIC MFG. CO., LTD., Osaka (JP)

(*) Notice: Subject to any disclaimer, the term of this patent is extended or adjusted under 35 U.S.C. 154(b) by 112 days.

(21) Appl. No.: 17/323,023

(22) Filed: May 18, 2021

(65) Prior Publication Data
US 2021/0399626 A1  Dec. 23, 2021

(30) Foreign Application Priority Data
Jun. 17, 2020  (JP) ............................. JP2020-104195

(51) Int. Cl.
*H02M 3/158* (2006.01)
*H02M 1/32* (2007.01)
*H02M 7/217* (2006.01)

(52) U.S. Cl.
CPC ............. *H02M 3/158* (2013.01); *H02M 1/32* (2013.01); *H02M 7/217* (2013.01)

(58) Field of Classification Search
CPC .... H02J 3/1842; H02M 3/158; H02M 3/1582; H02M 1/15; H02M 1/007
See application file for complete search history.

(56) References Cited

U.S. PATENT DOCUMENTS

| | | | | |
|---|---|---|---|---|
| 9,906,119 | B2* | 2/2018 | Chen ..................... | H02M 1/15 |
| 2013/0033910 | A1* | 2/2013 | Carletti .................. | H02M 7/12 |
| | | | | 363/131 |
| 2013/0051096 | A1* | 2/2013 | Carletti ............... | H02M 1/4225 |
| | | | | 363/84 |
| 2014/0369090 | A1* | 12/2014 | Ueki ................. | H02M 7/53871 |
| | | | | 363/41 |
| 2015/0333616 | A1* | 11/2015 | Li .......................... | H02M 1/15 |
| | | | | 713/300 |

(Continued)

OTHER PUBLICATIONS

Wang et al., "A Voltage Control Method for an Active Capacitive DC-link Module with Series-Connected Circuit", 2017 IEEE 3rd International Future Energy Electronics Conference and ECCE Asia, IFEEC—ECCE Asia, 2017, pp. 221-225.

*Primary Examiner* — Rafael O De Leon Domenech
(74) *Attorney, Agent, or Firm* — Birch, Stewart, Kolasch & Birch, LLP

(57) ABSTRACT

A power conversion device suppresses voltage variation of a power supply bus. The device includes a variation compensation circuit and a control circuit. The variation compensation circuit includes: a first capacitor connected to the power supply bus; a second capacitor connected in series between the first capacitor and a ground; an auxiliary capacitor; and a converter including a switching element and having a voltage step-down function, the converter being connected to the second capacitor and the auxiliary capacitor. The control circuit includes a proportional resonant control section having a peak gain for variation with a frequency $\omega_0$ which is twice a frequency of the single-phase alternating current. The control circuit uses the proportional resonant control section to generate a signal for controlling the switching element.

13 Claims, 7 Drawing Sheets

(56) References Cited

U.S. PATENT DOCUMENTS

| | | | |
|---|---|---|---|
| 2015/0372584 A1* | 12/2015 | Hirota | H02M 3/33584 |
| | | | 363/37 |
| 2017/0279367 A1* | 9/2017 | Qiu | H02M 1/143 |
| 2019/0229609 A1* | 7/2019 | Li | H02J 1/02 |
| 2019/0252995 A1* | 8/2019 | Dai | H02M 3/158 |
| 2021/0351690 A1* | 11/2021 | Liu | H02M 1/32 |

\* cited by examiner

POWER CONVERSION DEVICE

CROSS-REFERENCE TO RELATED APPLICATION

This application claims priority on and the benefit of Patent Application No. 2020-104195 filed in JAPAN on Jun. 17, 2020. The entire disclosures of this Japanese Patent Application are hereby incorporated by reference.

BACKGROUND OF THE INVENTION

Field of the Invention

The present invention relates to power conversion devices. In particular, the present invention relates to a device that suppresses voltage variation of a direct-current power supply bus in a power system involving conversion between a single-phase alternating current and a direct current.

Description of the Related Art

In recent years, the widespread use of high-capacity storage batteries and solar cells has led to an increasing demand for power supply systems involving conversion between a single-phase alternating current and a direct current. Examples of such power supply systems include charging systems for on-board storage batteries and household power supply systems employing storage batteries. In a charging system for an on-board storage battery, a single-phase alternating current supplied from an external power supply is converted to a direct current through an AC-to-DC converter and a power factor corrector (PFC). The direct current is converted to a desired voltage by a DC-to-DC converter, and the resulting direct current is delivered to the on-board storage battery. In a household power supply system employing a storage battery, a direct current supplied from the storage battery serving as a direct-current power supply is converted to a desired voltage by a DC-to-DC converter and further converted to a single-phase alternating current by an inverter.

In these power supply systems, an electrolytic capacitor having a high capacitance is commonly connected to a direct-current power supply bus to suppress voltage variation of the power supply bus. For example, an electrolytic capacitor is connected to a power supply bus connecting a PFC and a DC-to-DC converter or a power supply bus connecting a DC-to-DC converter and an inverter. Although electrolytic capacitors can have a higher capacitance than other kinds of capacitors, they have disadvantages such as a large volume leading to size increase of power supply systems and a short service life.

A power conversion device incorporating active power decoupling (APD) has been proposed as an alternative which can be used instead of electrolytic capacitors to achieve reduced size and increased service life of power supply systems. The device can suppress voltage variation by means of a low-capacitance capacitor, and thus allows for the use of a film or ceramic capacitor which has a small size and long service life. An example of this device is presented in "A Voltage Control Method for an Active Capacitive DC-link Module with Series-Connected Circuit", 2017 IEEE 3rd International Future Energy Electronics Conference and ECCE Asia, IFEEC—ECCE Asia, Page 221-225 (hereinafter referred to as Document 1).

The device of Document 1 is made up of a variation compensation circuit and a control circuit. The variation compensation circuit includes a first capacitor connected to a power supply bus, a second capacitor connected in series to the first capacitor, and an auxiliary capacitor. The auxiliary capacitor and second capacitor are connected via an inverter. The variation compensation circuit sends a power supply bus voltage and an auxiliary capacitor voltage to the control circuit. The control circuit sends to the variation compensation circuit a PWM signal for turning on and off a switching element of the inverter. The control circuit changes the duty cycle of the PWM signal to adjust the auxiliary capacitor voltage to a predetermined target voltage and allow the second capacitor to have a voltage suitable for compensating for variation of the power supply bus voltage. After the change in duty cycle, the variation compensation circuit feeds back the resulting power supply bus voltage and auxiliary capacitor voltage to the control circuit. This process is repeated to suppress voltage variation of the power supply bus. The variation compensation circuit and the control circuit constitute a feedback control system.

In a single-phase alternating-current power supply system, the instantaneous power varies with a frequency $\omega_0$ which is twice the frequency of the single-phase alternating current, and thus the variation of the voltage of the power supply bus from a target voltage is composed predominantly of a sinusoidal component with the frequency $\omega_0$. As such, control for adjusting the difference between the voltage of the power supply bus and the target voltage to zero is difficult to accomplish with a typical existing control technique such as proportional integral control (PI control). This makes it difficult to reliably suppress the voltage variation of the power supply bus.

An object of the present invention is to provide a power conversion device incorporating APD, the device being adapted to reliably suppress voltage variation of a power supply bus.

SUMMARY OF THE INVENTION

The present invention relates to a power conversion device that suppresses voltage variation of a direct-current power supply bus in a power system involving conversion between a single-phase alternating current and a direct current. The device includes a variation compensation circuit and a control circuit. The variation compensation circuit includes: a first capacitor C1 connected to the power supply bus; a second capacitor C2 connected in series between the first capacitor C1 and a ground; an auxiliary capacitor Cc; a converter including a switching element and having a voltage step-down function, the converter being connected to the second capacitor C2 and the auxiliary capacitor Cc; a first voltmeter that measures a voltage Vd of the power supply bus; a second voltmeter that measures a voltage Vc of the auxiliary capacitor Cc; and an ammeter that measures an output current Ia of the converter. The control circuit receives the voltage Vd, the voltage Vc, and the current Ia as inputs, and generates a switch control signal for controlling turning on and off of the switching element to adjust the voltage Vd to a predetermined target voltage VD and the voltage Vc to a predetermined target voltage VC. The control circuit includes a proportional resonant control section having a peak gain for variation with a frequency $\omega_0$ which is twice a frequency of the single-phase alternating current. The control circuit uses the proportional resonant control section to generate the switch control signal.

In the power conversion device according to the present invention, the control circuit includes the proportional resonant control section having a peak gain for variation with the frequency $\omega_0$ which is twice the frequency of the single-phase alternating current. The inclusion of the proportional resonant control section allows for control that suppresses the power supply bus voltage variation having a sinusoidal component with the frequency $\omega_0$. The device can reliably suppress voltage variation of the power supply bus.

Preferably, the proportional resonant control section has a peak gain for variation with a frequency which is an integral multiple of the frequency $\omega_0$.

Preferably, the control circuit includes: an IA determining section that determines an output current IA of the converter using the proportional resonant control section, the output current IA being for adjusting the voltage Vd to the target voltage VD; a V2p determining section that determines a voltage V2p of the second capacitor C2, the voltage V2P being for adjusting the voltage Vc to the target voltage VC and the current Ia to the current IA; and a switch control signal generating section that generates the switch control signal based on the voltage V2p and the voltage Vc.

In another embodiment, the control circuit may include: an IA determining section that determines an output current IA of the converter, the output current IA being for adjusting the voltage Vd to the target voltage VD and the voltage Vc to the target voltage VC; a V2p determining section that determines a voltage V2p of the second capacitor C2 using the proportional resonant control section, the voltage V2P being for adjusting the current Ia to the current IA; and a switch control signal generating section that generates the switch control signal based on the voltage V2p and the voltage Vc.

Preferably, the control circuit further includes an oscillation frequency component reducing circuit that reduces the amount of a component with an oscillation frequency which depends on the second capacitor C2 and the converter, the current Ia coming from the variation compensation circuit is passed through the reducing circuit, and an output from the reducing circuit is used as the current Ia to generate the switch control signal.

Preferably, the reducing circuit is a notch filter.

Preferably, the converter is an inverter or a step-down chopper.

The present invention relates to a method of controlling a variation compensation circuit for a power conversion device that suppresses voltage variation of a direct-current power supply bus in a power system involving conversion between a single-phase alternating current and a direct current. The variation compensation circuit includes: a first capacitor C1 connected to the power supply bus; a second capacitor C2 connected in series between the first capacitor C1 and a ground; an auxiliary capacitor Cc; a converter including a switching element and having a voltage step-down function, the converter being connected to the second capacitor C2 and the auxiliary capacitor Cc; a first voltmeter that measures a voltage Vd of the power supply bus; a second voltmeter that measures a voltage Vc of the auxiliary capacitor Cc; and an ammeter that measures an output current Ia of the converter. The method includes the steps of:

(A) receiving the voltage Vd, the voltage Vc, and the current Ia as inputs; and (B) generating a switch control signal for controlling turning on and off of the switching element to adjust the voltage Vd to a predetermined target voltage VD and the voltage Vc to a predetermined target voltage VC.

In the step (B), proportional resonant control is performed, and the proportional resonant control has a peak gain for variation with a frequency $\omega_0$ which is twice a frequency of the single-phase alternating current.

Preferably, the proportional resonant control performed in the step (B) has a peak gain for variation with a frequency which is an integral multiple of the frequency $\omega_0$.

Preferably, the step (B) includes the steps of:

(B1) determining an output current IA of the converter by the proportional resonant control, the output current IA being for adjusting the voltage Vd to the target voltage VD;

(B2) determining a voltage V2p of the second capacitor C2, the voltage V2p being for adjusting the voltage Vc to the target voltage VC and the current Ia to the current IA; and (B3) generating the switch control signal based on the voltage V2p and the voltage Vc.

In another embodiment, the step (B) may include the steps of:

(B1') determining an output current IA of the converter, the output current IA being for adjusting the voltage Vd to the target voltage VD and the voltage Vc to the target voltage VC;

(B2') determining a voltage V2p of the second capacitor C2 by the proportional resonant control, the voltage V2p being for adjusting the current Ia to the current IA; and (B3') generating the switch control signal based on the voltage V2p and the voltage Vc.

Preferably, the method further includes the step of:

(C) after receiving the current Ia as an input in the step (A), passing the received current Ia through an oscillation frequency component reducing circuit that reduces the amount of a component with an oscillation frequency which depends on the second capacitor C2 and the converter, and in the step (B), the current passed through the reducing circuit is used as the current Ia.

Preferably, the reducing circuit is a notch filter.

DESCRIPTION OF THE PREFERRED EMBODIMENTS

The following will describe in detail the present invention based on preferred embodiments with appropriate reference to the drawings.

Figure 1:
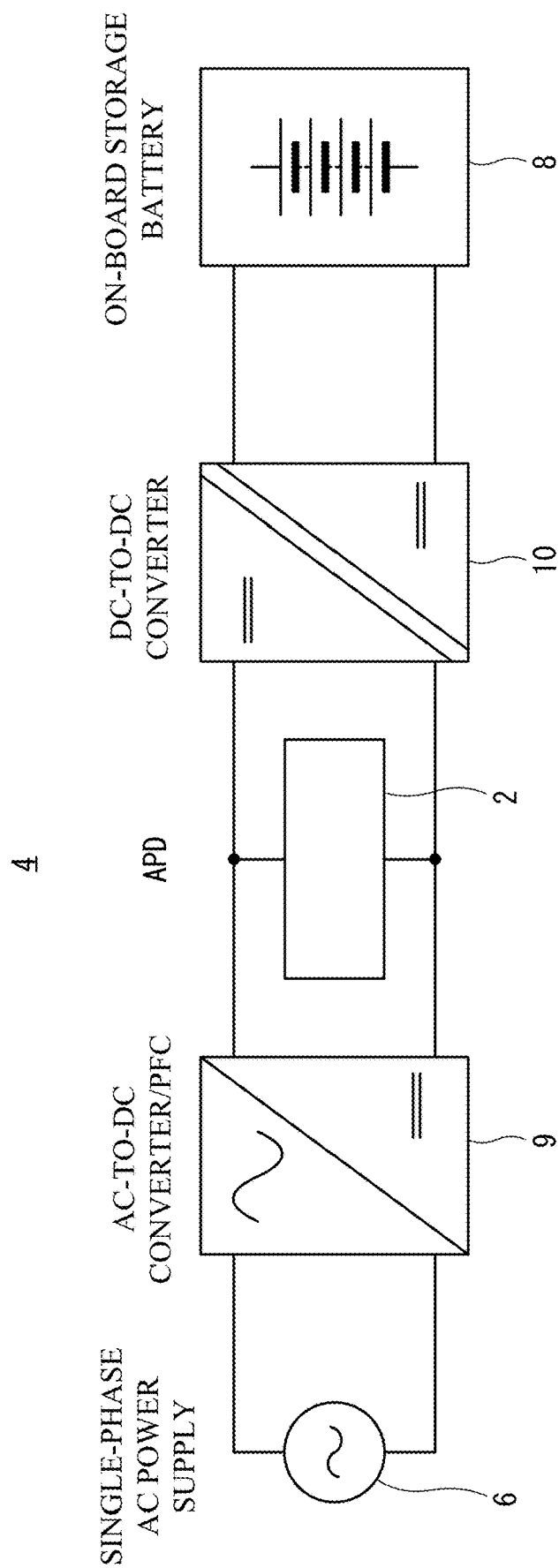
FIG. 1 is a block diagram showing an example of a power supply system employing a power conversion device according to the present invention.

A power conversion device 2 according to the present invention is for use in a power system using a single-phase alternating current. The power conversion device 2 is connected to a direct-current power supply bus in a power supply system involving conversion between a single-phase alternating current and a direct current. The power conversion device 2 incorporates active power decoupling and suppresses voltage variation of the direct-current power supply bus. FIG. 1 shows a power system 4 employing the power conversion device 2. In this figure, the power conversion device 2 is shown as "APD".

The power system 4 of FIG. 1 is a system in which an on-board storage battery 8 is charged with electric power supplied from an external single-phase alternating-current power supply 6. A single-phase alternating current is converted to a direct current through an AC-to-DC converter and a power factor corrector 9 (PFC 9), then the direct current is further converted to a desired voltage by a DC-to-DC converter 10, and the resulting direct current is delivered to the on-board storage battery 8. In this embodiment, the device 2 is connected to a power supply bus connecting the PFC 9 and the DC-to-DC converter 10. Although not illustrated, an example of other power supply systems in which the device 2 can be used is a household single-phase alternating-current power supply system employing a storage battery. In the household power supply system, the device 2 is connected to a power supply bus connecting a DC-to-DC converter and an inverter.

First Embodiment

Figure 2:
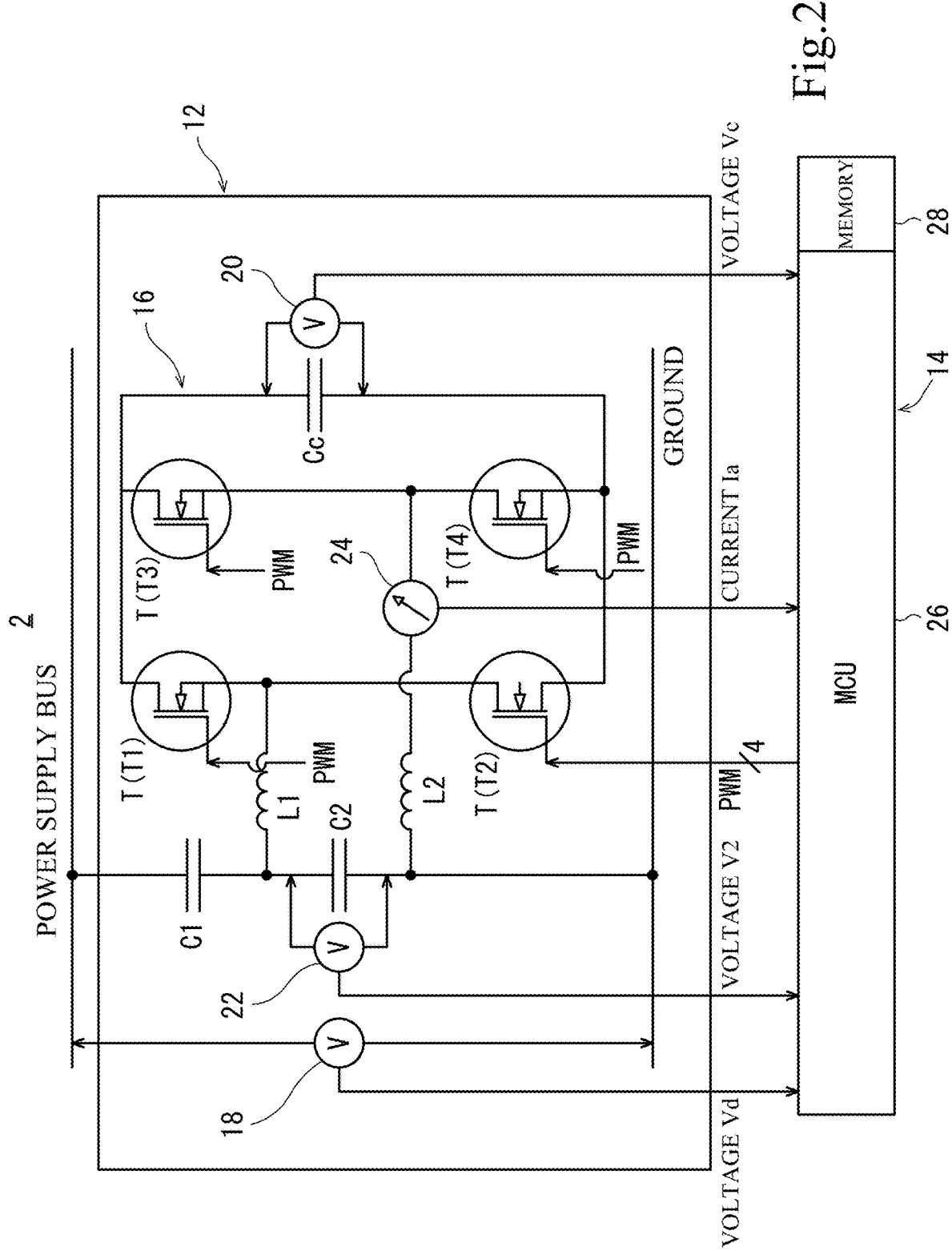
FIG. 2 is a circuit diagram showing a power conversion device according to an embodiment of the present invention.

FIG. 2 is a circuit diagram showing the power conversion device 2 according to an embodiment of the present invention. As shown in the figure, the device 2 includes a variation compensation circuit 12 and a control circuit 14.

The variation compensation circuit 12 is connected to a power supply bus. As shown in FIG. 2, the variation compensation circuit 12 includes a first capacitor C1, a second capacitor C2, an auxiliary capacitor Cc, a converter 16, a first voltmeter 18, a second voltmeter 20, a third voltmeter 22, and an ammeter 24.

The first capacitor C1 has one end connected to the power supply bus and the other end connected to the second capacitor C2. The second capacitor C2 is inserted in series between the first capacitor C1 and a ground. The converter 16 is connected to the second capacitor C2 and the auxiliary capacitor Cc. The converter 16 includes two input terminals and two output terminals. Each input terminal is connected to a corresponding one of the terminals of the auxiliary capacitor Cc, and each output terminal is connected to a corresponding one of the terminals of the second capacitor C2.

The converter 16 includes a switching element T. In this embodiment, the converter 16 is configured as an inverter including four switching elements T1, T2, T3, and T4 and two inductors L1 and L2. Each switching element T is configured as a MOSFET. Each switching element T may be configured as another kind of switching element such as an IGBT, a JFET, or an HFET. To the gate of each switching element T is connected a switch control signal provided from the control circuit 14. In this embodiment, a pulse width modulation (PWM) signal provided from the control circuit 14 is connected to the gate of each switching element T. The ratio between the turning-on and turning-off periods of the switching element T depends on the duty cycle of the PWM signal. The voltage V2 of the second capacitor C2 can be stepped down below the voltage Vc of the auxiliary capacitor Cc by the converter 16. The amount of step-down of the voltage V2 relative to the voltage Vc can be controlled as a function of the duty cycle of the PWM signal.

As described above, the second capacitor C2 is connected in series between the power supply bus and the ground, with the first capacitor C1 interposed between the second capacitor C2 and the power supply bus. The voltage V2 of the second capacitor C2 is controlled by the PWM signal so as to compensate for the variation of the voltage Vd of the power supply bus, and thereby the variation of the voltage Vd of the power supply bus can be suppressed.

In the variation compensation circuit 12, charge and discharge of the auxiliary capacitor Cc is effected by the variation of the voltage Vd of the power supply bus through the converter 16. The voltage Vc of the auxiliary capacitor Cc can be varied as a function of the duty cycle of the PWM signal.

The switch control signal need not be the PWM signal. The switch control signal may be a pulse density modulation (PDM) signal. The switch control signal may be any kind of signal insofar as the ratio between the turning-on and turning-off periods of the switching element T (the ratio between the H and L periods of the switch control signal) can be varied to control the voltage V2 of the second capacitor C2.

In this embodiment, as described above, the converter 16 is embodied as an inverter. The converter 16 need not be embodied as an inverter. The converter 16 may be any kind of circuit that is able to control the amount of step-down of the voltage V2 relative to the voltage Vc. The converter 16 may be embodied, for example, as a step-down chopper.

The first voltmeter 18 measures the voltage Vd of the power supply bus. The second voltmeter 20 measures the voltage Vc of the auxiliary capacitor Cc. The third voltmeter 22 measures the voltage V2 of the second capacitor C2. The ammeter 24 measures an output current Ia of the converter 16. The measured voltage Vd, voltage Vc, voltage V2, and current Ia are sent to the control circuit 14.

In this embodiment, as shown in FIG. 2, the control circuit 14 includes a processor (MCU) 26, a memory 28, and a non-illustrated program. The program is stored in the memory 28. The control circuit 14 receives the voltage Vd, voltage Vc, and current Ia as inputs from the variation compensation circuit 12. The control circuit 14 generates a switch control signal for controlling turning on and off of the switching element T of the variation compensation circuit 12. In this embodiment, the control circuit 14 generates a PWM signal as the switch control signal. The control circuit 14 receives the voltages Vd and Vc as inputs from the variation compensation circuit 12 and provides the variation compensation circuit 12 with the switch control signal as a manipulated variable for adjusting each of the voltages Vd and Vc to a target voltage. The control circuit 14 and the variation compensation circuit 12 constitute a feedback control system.

Figure 3:
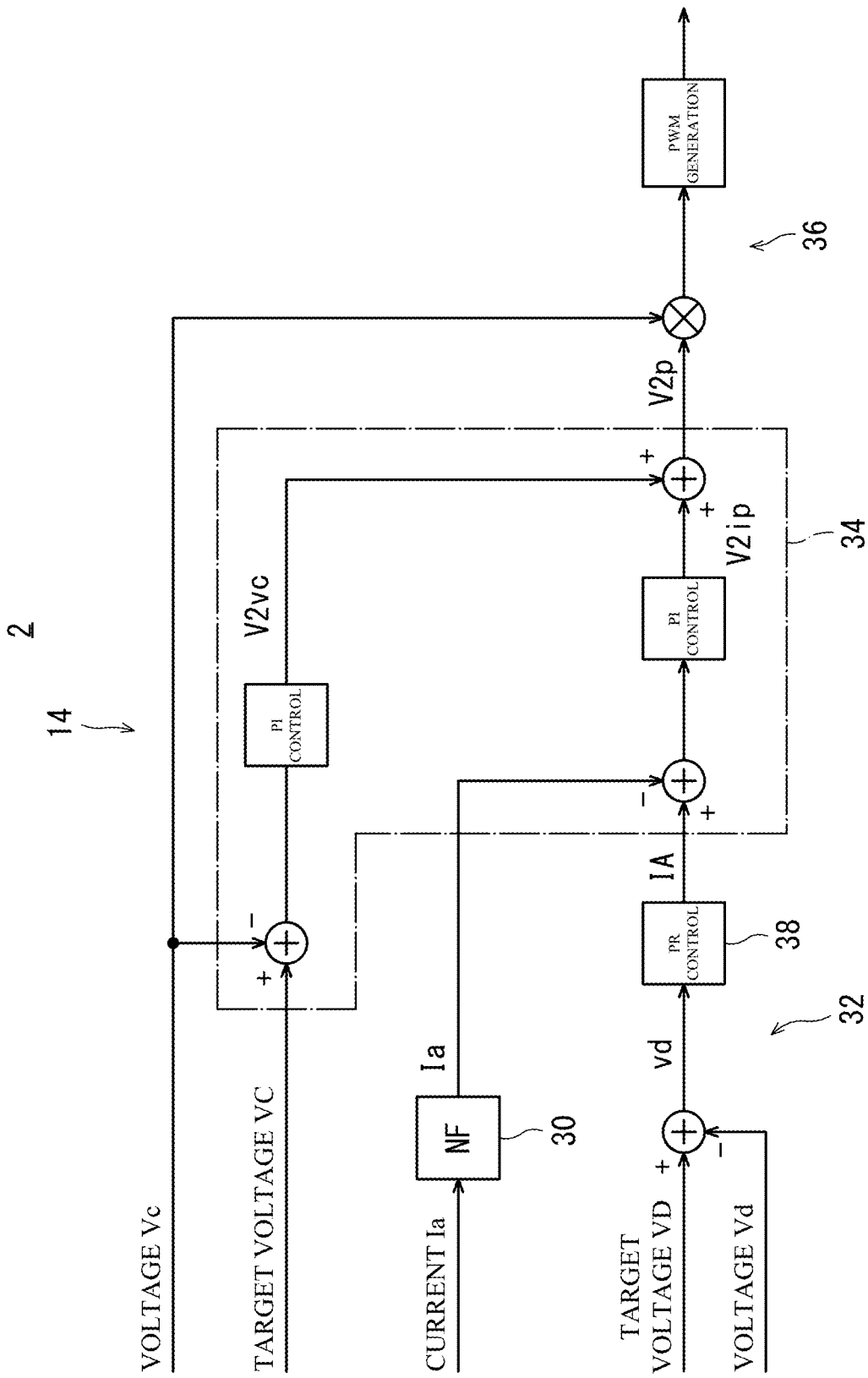
FIG. 3 is a block diagram showing the operation of a control circuit of the device of FIG. 2.

FIG. 3 is a block diagram illustrating the function of the control circuit 14. The control circuit 14 receives a predetermined target voltage VD of the power supply bus and a predetermined target voltage VC of the auxiliary capacitor Cc as inputs in addition to the voltage Vd, voltage Vc, and current Ia sent from the variation compensation circuit 12. As seen from FIG. 3, the control circuit 14 includes a notch filter 30 (NF 30), a section 32 for determining a converter output current IA (IA determining section 32), a section 34 for determining a voltage of the second capacitor C2 (V2p determining section 34), and a section 36 for generating a PWM signal as a final manipulated variable (PWM generating section 36).

The voltage V2 of the second capacitor C2 as measured by the third voltmeter 22 is not used in the process performed by the control circuit 14. The voltage measured by the third voltmeter 22 is used in an evaluation test to examine the voltage V2 of the second capacitor C2. The voltage V2 is therefore not shown in FIG. 3.

In this embodiment, the constituting parts of the control circuit 14 are not embodied as the corresponding dedicated circuits, but are embodied by the MCU 26 operated by the program. A part of the control circuit 14 may be embodied as a dedicated circuit. For example, the NF 30 may be embodied as a dedicated circuit, and the other parts of the control circuit 14 may be embodied by the MCU 26 operated by the program. All the parts of the control circuit 14 may be embodied as dedicated circuits.

The NF 30 is a filter having a lower gain at a particular frequency than at the other frequencies. The NF 30 is configured to have a low gain at an oscillation frequency Fo which depends on the capacitor C2 and inductors L1 and L2. The NF 30 is an oscillation frequency component reducing circuit that reduces the amount of a component with the frequency Fo. In this embodiment, the current Ia coming from the variation compensation circuit 12 is passed through the NF 30. The output current of the NF 30 contains a smaller amount of the component with the frequency Fo than the input current Ia. The output current of the NF 30 is not the same as the input current Ia. However, in the present specification, the input current Ia and the output current of the NF 30 are not differentiated unless such differentiation is necessary. The output current of the NF 30 is described as the current Ia.

The IA determining section 32 determines an output current IA of the converter 16 as an intermediate manipulated variable to eliminate the difference (variation voltage vd) between the measured voltage Vd of the power supply bus and the target voltage VD of the power supply bus. The variation voltage vd is a component corresponding to the variation of the voltage Vd of the power supply bus from the target voltage VD. As shown in FIG. 3, the IA determining section 32 includes a proportional resonant control section 38 (PR control section 38). The IA determining section 32 performs proportional resonant control (PR control) to determine the current IA as an intermediate manipulated variable.

In the present specification, an "intermediate manipulated variable" refers to a manipulated variable which is an output of the PR control or proportional integral control (PI control) described below and which is used to generate a PWM signal as a final manipulated variable to be provided to the variation compensation circuit 12.

A transfer function Gi(s) of the PR control section 38 is expressed as follows.

$$G_i(s) = k_p + k_r \frac{s}{s^2 + \omega_0^2} + \sum_h \frac{k_{rh} s}{s^2 + (h\omega_0)^2}$$

In the function Gi(s), the first term is a proportional term, and $k_p$ is a proportionality constant. The second term is a resonant term for the frequency $\omega_0$ described above, and $k_r$ is a proportionality constant. The third term is a resonant term for a frequency $h*\omega_0$ which is an integral multiple of the frequency $\omega_0$ (h is an integer of 2 or more). The required value or type of h (e.g., h=3, 5, 7) depends, for example, on the intended performance. The third term may be eliminated. In this embodiment, the transfer function Gi(s) of the PR control section 38 does not include the third term. In this embodiment, the transfer function Gi(s) of the PR control section 38 consists of the proportional term and the resonant term for the frequency $\omega_0$.

In this embodiment, the PR control section 38 is embodied by the MCU 26 configured as a digital circuit and operated by the program. Thus, the following transfer function resulting from z-transform of the above transfer function Gi(s) is implemented in the program.

$$G(z) = \frac{b_0 + b_1 z^{-1} + b_2 z^{-2}}{1 - a_1 z^{-1} - a_2 z^{-2}}$$

Figure 4:
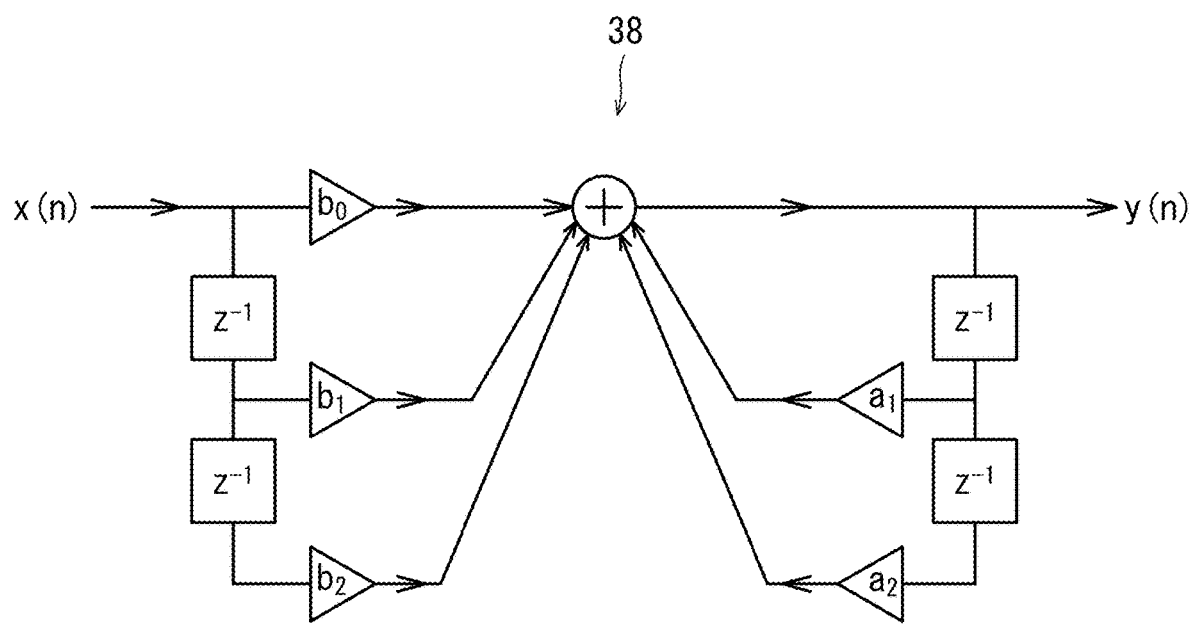
FIG. 4 is a block diagram showing the operation of a proportional resonant control section of the control circuit of FIG. 3.

The coefficients $a_1$, $a_2$, $b_0$, $b_1$, and $b_2$ are obtained by bilinear transform of the function Gi(s) into the z-space. As seen from the above expression, the PR control section 38 is an IIR filter. FIG. 4 is a block diagram of the PR control section 38.

Figure 5:
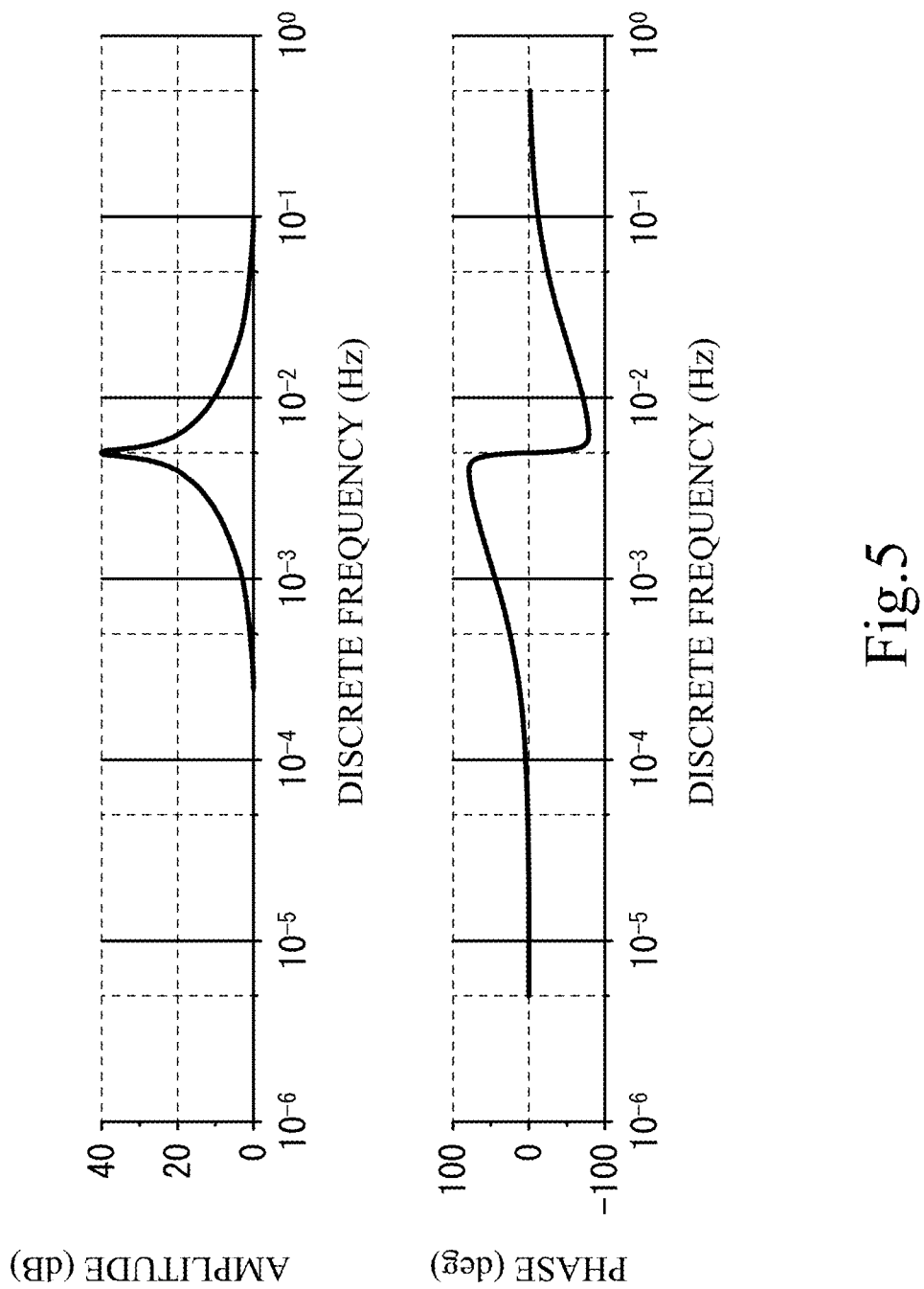
FIG. 5 is a Bode plot showing the frequency response of the proportional resonant control section of FIG. 4.

FIG. 5 is a Bode plot showing the frequency response of the PR control section 38. The PR control section 38 has a peak gain for variation with the frequency $\omega_0$. The PR control section has a high gain for variation with the frequency $\omega_0$. In FIG. 5, the abscissa represents the discrete frequency. The discrete frequency is equal to the frequency of the signal divided by the sampling frequency (the frequency in sampling performed to process the signal by the MCU 26 configured as a digital circuit). In this embodiment, the sampling frequency is 20 kHz. The PR control section 38 has a peak gain for variation with a frequency $\omega_0$ of 100 Hz.

The V2p determining section 34 determines a voltage V2p of the second capacitor C2 as an intermediate manipulated variable. As shown in FIG. 3, the V2p determining section 34 includes a first proportional integral control section (first PI control section) and a second PI control section. The difference between the currents IA and Ia is calculated, and the first PI control section determines the voltage V2ip for adjusting the difference to zero. The voltage V2ip is a voltage of the second capacitor C2 and is an intermediate manipulated variable for adjusting the voltage Vd to the target voltage VD. The difference between the voltage Vc and the target voltage VC is calculated, and the second PI control section determines a voltage V2vc for adjusting the difference to zero. The voltage V2vc is a voltage of the second capacitor C2 and is an intermediate manipulated variable for adjusting the voltage Vc to the target voltage VC. As shown below, the voltage V2p is the sum of the voltages V2ip and V2vc.

V2p=V2ip+V2vc

A control technique other than the PI control may be used for determination of the voltage V2ip or V2vc. For example, an integral control section (I control section) may be used instead of the first PI control section, and an I control section may be used instead of the second PI control section.

The PWM generating section 36 determines the duty cycle of a PWM signal based on the voltage V2p determined as an intermediate manipulated variable and the voltage Vc of the auxiliary capacitor Cc. The duty cycle is determined based on the ratio between the voltage V2p and the voltage Vc. A PWM signal with this duty cycle is generated. The PWM signal is sent as a manipulated variable of the feedback control to the variation compensation circuit 12.

The following will describe the method used by the control circuit 14 of the device 2 to control the variation compensation circuit 12.

The method used by the control circuit 14 to control the variation compensation circuit 12 includes the steps of: receiving the voltage Vd, the voltage Vc, and the current Ia as inputs; and generating the switch control signal. The switch control signal controls the turning-on and off of the switching element to adjust the voltage Vd to the predetermined target voltage VD and the voltage Vc to the predetermined target voltage VC. In this embodiment, the switch control signal is a PWM signal.

The step of generating the switch control signal includes the steps of:

(1) passing the current Ia through the NF 30;

(2) obtaining the variation voltage vd of the power supply bus;

(3) determining the output current IA of the converter 16 as an intermediate manipulated variable;

(4) determining the voltage V2*ip* of the second capacitor C2 for adjusting the voltage Vd to the target voltage VD;

(5) determining the voltage V2*vc* of the second capacitor C2 for adjusting the voltage Vc to the target voltage VC;

(6) determining the voltage V2*p* of the second capacitor C2 as an intermediate manipulated variable based on the voltages V2*ip* and V2*vc*; and (7) generating the PWM signal.

The steps (1) to (7) need not be performed in this order. If a signal needed to perform one step is generated in another step, the other step of generating the signal should precede the one step in which the signal is used. With the exception of such cases, the steps may be performed in any order. For example, the steps (2) and (3) need to be performed in this order. The step (1) may precede the steps (2) and (3), and vice versa. The step (1) may be performed concurrently with the steps (2) and (3). The step (4) may precede the step (5), and vice versa. The steps (4) and (5) may be performed concurrently. The step (6) needs to be performed after the steps (1) to (5), and the steps (6) and (7) need to be performed in this order.

In the step (1), the current Ia coming from the variation compensation circuit 12 is passed through the NF 30. The resulting output current is used as the current Ia in the step (4).

In the step (2), the difference between the measured voltage Vd of the power supply bus and the target voltage VD of the power supply bus is calculated to obtain the variation voltage vd. In the step (3), PR control is performed to determine the output current IA of the converter 16 as an intermediate manipulated variable for adjusting the variation voltage vd to zero.

In the step (4), the difference between the currents IA and Ia is calculated. PI control is performed to determine the voltage V2*ip* of the second capacitor C2 for adjusting the current Ia to the current IA. In the step (5), the difference between the voltage Vc and the target voltage VC is calculated. PI control is performed to determine the voltage V2*vc* of the second capacitor C2 for adjusting the voltage Vc to the target voltage VC. In the step (6), the sum of the voltages V2*ip* and V2*vc* is calculated to determine the voltage V2*p* of the second capacitor C2 as an intermediate manipulated variable.

In the step (7), the duty cycle of the PWM signal is updated based on the voltage V2*p* and the voltage Vc of the auxiliary capacitor Cc. The value to which the duty cycle is updated is determined based on the ratio between the voltage V2*p* and the voltage Vc. The PWM signal having the updated duty cycle is sent as a manipulated variable to the variation compensation circuit 12.

The variation compensation circuit 12 measures the voltage Vd, voltage Vc, and current Ia generated under control of the updated PWM signal. The voltage Vd, voltage Vc, and current Ia are fed back to the control circuit 14, by which the steps (1) to (7) are performed again. This process is repeated.

The following will describe the advantages of the present invention.

The device 2 according to the present invention is a power conversion device incorporating APD. The device 2 can suppress voltage variation of a power supply bus by means of a low-capacitance capacitor, and thus allows for the use of a film or ceramic capacitor which has a small size and long service life. A power supply system employing the device 2 can have a smaller size and longer service life than conventional power supply systems employing electrolytic capacitors.

The device 2 uses the PR control section 38 for the control that determines the output current IA of the converter 16 for adjusting the voltage Vd to the target voltage VD. The PR control section 38 has a peak gain for variation with the frequency $\omega_0$. In a single-phase alternating-current power supply system, the instantaneous power varies with the frequency $\omega_0$, and thus the voltage Vd is composed predominantly of a sinusoidal component with the frequency $\omega_0$. In the device 2, the use of PR control having a high gain for variation with the frequency $\omega_0$ allows for the control that adjusts the difference between the voltage Vd and the target voltage VD to zero. Thus, the variation of the voltage Vd of the power supply bus can be reliably suppressed.

The device 2 determines the output current IA of the converter 16 as an intermediate manipulated variable based on the voltage Vd and target voltage VD of the power supply bus. The device 2 generates the PWM signal based on the output current IA, the voltage Vc of the auxiliary capacitor Cc, and the target voltage VC of the auxiliary capacitor Cc. The PWM signal is a manipulated variable for adjusting the voltage Vd to the target voltage VD and the voltage Vc to the target voltage VC. The device 2 does not require any current supplied from the power supply bus. The device 2 eliminates the need for an external sensor. The device 2 can be used by connecting it to the power supply bus, and the use of the device 2 does not affect the configuration of the other parts of the power supply system.

In this embodiment, as described above, the current Ia is passed through the NF 30 having a low gain at the oscillation frequency Fo which depends on the second capacitor C2 and the inductors L1 and L2. The component with the oscillation frequency Fo is substantially removed from the current Ia. This enables the control circuit 14 to operate without being affected by oscillation originating from the second capacitor C2 and inductors L1 and L2. Thus, the device 2 can reliably suppress the variation of the voltage Vd of the power supply bus. Further, there is no need to take into account the influence on the control circuit 14 when choosing the sizes of the second capacitor C2 and inductors L1 and L2. This increases the flexibility in choosing the sizes of the second capacitor C2 and inductors L1 and L2. For example, the second capacitor C2 and inductors L1 and L2 of small size can be selected.

Second Embodiment

Figure 6:
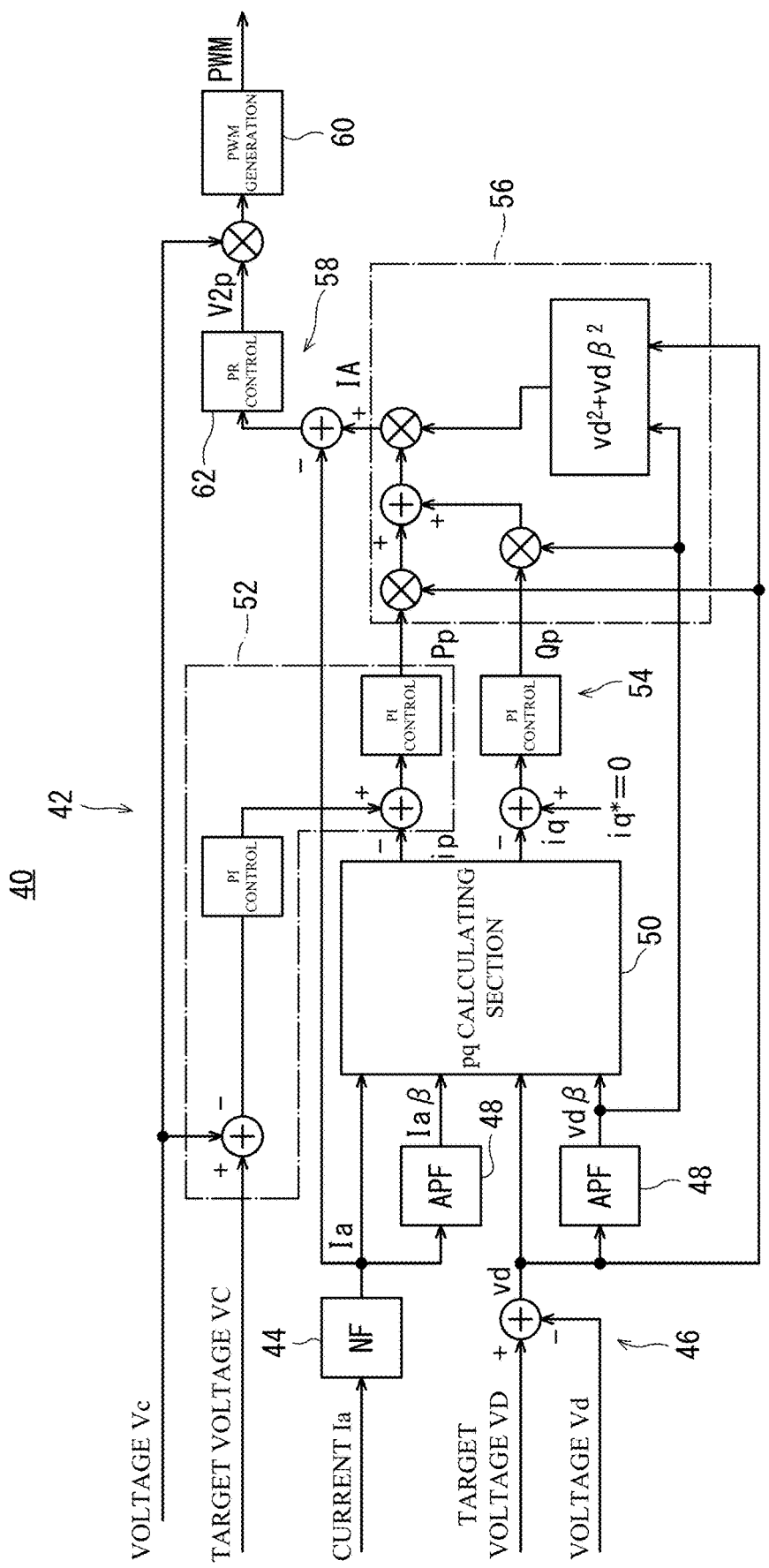
FIG. 6 is a block diagram showing the operation of a control circuit of a power conversion device according to another embodiment of the present invention.

FIG. 6 is a block diagram showing a control circuit 42 of a power conversion device 40 according to another embodiment of the present invention. The device 40 includes a variation compensation circuit identical to the variation compensation circuit 12 of the power conversion device 2 of FIG. 2. As seen from FIG. 6, the control circuit 42 includes a notch filter 44 (NF 44), a variation component voltage extracting section 46 (vd extracting section 46), an all-pass filter 48 (APF 48), an instantaneous active/reactive power calculating section 50 (pq calculating section 50), a section 52 for determining instantaneous active power as an intermediate manipulated variable (Pp determining section 52), a section 54 for determining instantaneous reactive power as an intermediate manipulated variable (Qp determining section 54), a section 56 for calculating a converter output current (IA calculating section 56), a section 58 for determining a voltage of the second capacitor C2 as an intermediate manipulated variable (V2p determining section 58), and a section 60 for generating a PWM signal (PWM generating section 60). Among these parts of the control circuit 42, the vd extracting section 46, APF 48, pq calculating section 50, Qp determining section 54, and IA calculating section 56 are involved in determining the output current IA of the converter for adjusting the voltage Vd to the target voltage VD and the voltage Vc to the target voltage VC. The NF 44 is identical to the NF 30 of FIG. 3.

The vd extracting section 46 calculates a difference between the measured voltage Vd of the power supply bus and the target voltage VD of the power supply bus. Thus, a variation voltage vd is obtained. The variation voltage vd is a component corresponding to the variation of the voltage Vd of the power supply bus from the target voltage VD.

The APF 48 is a filter that shifts the phase of a signal having a given frequency without changing the amplitude of the signal. The APF 48 is designed to shift the phase of a signal having a frequency $\omega_0$ by $-90°$ (retard the phase by $90°$). The frequency $\omega_0$ is twice the frequency of a single-phase alternating current used in a power supply system. In a single-phase alternating-current power supply system, the instantaneous power varies with the frequency $\omega_0$. Thus, the variation voltage vd and the current Ia are each composed predominantly of a component with the frequency $\omega_0$. As shown in FIG. 6, the variation voltage vd is passed through the APF 48, and thus a voltage vdβ phase-shifted from the voltage vd by $-90°$ is output. Further, the current Ia is passed through the APF 48, and thus a current Iaβ phase-shifted from the current Ia by $-90°$ is output.

The pq calculating section 50 calculates instantaneous active power ip and instantaneous reactive power iq in the variation compensation circuit 12 which are generated by voltage variation of the power supply bus. Since the voltage vdβ and the current Iaβ have been obtained, the instantaneous active power ip and the instantaneous reactive power iq can be calculated by the following equations.

Instantaneous active power $ip = vd*Ia + vdβ*Iaβ$

Instantaneous reactive power $iq = vd*Iaβ + vdβ*Ia$

The Pp determining section 52 determines instantaneous active power Pp as an intermediate manipulated variable based on the measured voltage Vc of the auxiliary capacitor Cc, the target voltage VC of the auxiliary capacitor Cc, and the instantaneous active power ip. The instantaneous active power Pp is for adjusting the voltage of the auxiliary capacitor Cc to the target voltage VC. As shown in FIG. 6, the Pp determining section 52 performs first proportional integral control (PI control) to determine a first intermediate manipulated variable Pp 1 based on the difference between the voltage Vc and the target voltage VC. The Pp determining section 52 performs second PI control to determine the instantaneous active power Pp as an intermediate manipulated variable based on the difference between the first intermediate manipulated variable Pp 1 and the instantaneous active power ip calculated by the pq calculating section 50. The Pp determining section 52 uses the instantaneous active power ip to control the voltage of the auxiliary capacitor Cc.

A control technique other than the PI control may be used to determine the instantaneous active power Pp. For example, I control may be used instead of the first PI control, and I control may be used instead of the second PI control.

The Qp determining section 54 performs PI control to determine instantaneous reactive power Qp as an intermediate manipulated variable with the goal of adjusting the instantaneous reactive power iq to zero. Adjusting the instantaneous reactive power iq to zero leads to a reduction in the variation voltage vd. Thus, the variation of the voltage Vd of the power supply bus is suppressed. A control technique other than the PI control may be used for determination of the instantaneous reactive power Qp. For example, I control may be used instead of the PI control.

The IA calculating section 56 uses the following equation to calculate a converter output current IA based on the instantaneous active power Pp and the instantaneous reactive power Qp.

$$IA = (Pp*vd + Qp*vdβ)/(vd^2 + vdβ^2)$$

FIG. 6 illustrates the operation performed by the IA calculating section 56 using the above equation.

The V2p determining section 58 determines a voltage V2p of the second capacitor C2 based on the measured converter output current Ia and the converter output current IA determined by the above calculation. The voltage V2p is for adjusting the difference between the currents Ia and IA to zero. As shown in FIG. 6, the V2p determining section 58 includes a proportional resonant control section 62 (PR control section 62). The V2p determining section 58 performs proportional resonant control (PR control) to determine the voltage V2p based on the difference between the currents Ia and IA.

The transfer function of the PR control section 62 consists of a proportional term and a resonant term for the frequency $\omega_0$ just as does the transfer function of the PR control section 38 of FIG. 3. The PR control section 62 has a peak gain for variation with the frequency $\omega_0$. The PR control section 62 has a high gain for variation with the frequency $\omega_0$.

The PWM generating section 60 determines the duty cycle of a PWM signal based on the voltage V2p determined as an intermediate manipulated variable and the voltage Vc of the auxiliary capacitor Cc. The duty cycle is determined based on the ratio between the voltage V2p and the voltage Vc. A PWM signal with this duty cycle is generated. The PWM signal is sent as a manipulated variable of the feedback control to the variation compensation circuit.

The following will describe the method used by the control circuit 42 of the device 40 to control the variation compensation circuit.

The method used by the control circuit 42 to control the variation compensation circuit includes the steps of: receiving the voltage Vd, the voltage Vc, and the current Ia as inputs; and generating the switch control signal. The switch control signal controls the turning-on and off of the switching element to adjust the voltage Vd to the predetermined target voltage VD and the voltage Vc to the predetermined target voltage VC. In this embodiment, the switch control signal is a PWM signal.

The step of generating the switch control signal includes the steps of:

(1) passing the current Ia through the NF 44;
(2) passing the current Ia through the APF 48 after passing of the current Ia through the NF 44;
(3) obtaining the variation voltage vd of the power supply bus;
(4) passing the variation voltage vd through the APF 48;
(5) calculating the instantaneous active power ip;
(6) determining the instantaneous active power Pp as an intermediate manipulated variable;
(7) calculating the instantaneous reactive power iq;
(8) determining the instantaneous reactive power Qp as an intermediate manipulated variable;
(9) calculating the output current IA of the converter;
(10) determining the voltage V2$p$ of the second capacitor C2 as an intermediate manipulated variable; and
(11) generating the PWM signal.

Among these steps, the steps (2) to (9) are involved in determining the output current IA of the converter as an intermediate manipulated variable for adjusting the voltage Vd to the target voltage VD and the voltage Vc to the target voltage VC.

The steps (1) to (11) need not be performed in this order. If a signal needed to perform one step is generated in another step, the other step of generating the signal should precede the one step in which the signal is used. With the exception of such cases, the steps may be performed in any order.

In the step (1), the current Ia coming from the variation compensation circuit is passed through the NF 44. In the step (2), the current Ia passed through the NF 44 is passed through the APF 48 to obtain the current Iaβ phase-shifted from the current Ia by −90°.

In the step (3), the difference between the measured voltage Vd of the power supply bus and the target voltage VD of the power supply bus is calculated to obtain the variation voltage vd. In the step (4), the variation voltage vd is passed through the APF 48 to obtain the voltage vdβ phase-shifted from the variation voltage vd by −90°.

In the step (5), the following equation is used to calculate the instantaneous active power ip based on the current Iaβ, voltage vdβ, current Ia, and variation voltage vd which have been obtained in the previous steps.

Instantaneous active power $ip = vd*Ia + vd\beta*Ia\beta$

In the step (6), the first PI control is performed to determine the first intermediate manipulated variable Pp 1 based on the difference between the voltages Vc and VC. The first intermediate manipulated variable Pp 1 is for adjusting the voltage Vc to the target voltage VC. Subsequently, the second PI control is performed to determine the instantaneous active power Pp as an intermediate manipulated variable based on the difference between the first intermediate manipulated variable Pp 1 and the instantaneous active power ip calculated in the step (5). The instantaneous active power Pp is for adjusting the difference to zero.

In the step (7), the following equation is used to calculate the instantaneous reactive power iq based on the current Ian, voltage vdβ, current Ia, and variation voltage vd which have been obtained in the previous steps.

Instantaneous reactive power $iq = vd*Ia\beta + vd\beta*Ia$

In the step (8), PI control is performed to determine the instantaneous reactive power Qp as an intermediate manipulated variable. The instantaneous reactive power Qp is for adjusting the instantaneous reactive power iq to zero. Adjusting the instantaneous reactive power iq to zero leads to a reduction in the variation voltage vd.

In the step (9), the following equation is used to calculate the converter output current IA based on the voltages Vd and vdβ and the instantaneous active power Pp and instantaneous reactive power Qp which have been determined as intermediate manipulated variables.

$IA = (Pp*vd + Qp*vd\beta)/(vd^2 + vd\beta^2)$

In the step (10), PR control is performed to determine the voltage V2$p$ as an intermediate manipulated variable based on the measured converter output current Ia and the calculated converter output current IA. The voltage V2$p$ is for adjusting the difference between the currents Ia and IA to zero.

In the step (11), the duty cycle of the PWM signal is updated based on the voltage V2$p$ and the voltage Vc of the auxiliary capacitor Cc. The value to which the duty cycle is updated is determined based on the ratio between the voltage V2$p$ and the voltage Vc. The PWM signal having the updated duty cycle is sent as a manipulated variable to the variation compensation circuit.

The variation compensation circuit measures the voltage Vd, voltage Vc, and current Ia generated under control of the updated PWM signal. The voltage Vd, voltage Vc, and current Ia are fed back to the control circuit 42, by which the steps (1) to (11) are performed again. This process is repeated.

The device 40 determines the output current IA of the converter for adjusting the voltage Vd to the target voltage VD and the voltage Vc to the target voltage VC. The device 40 uses the PR control section 62 for the control that determines the voltage V2$p$ based on the difference between the currents Ia and IA. The PR control section 62 has a peak gain for variation with the frequency $\omega_0$. In a single-phase alternating-current power supply system, the instantaneous power varies with the frequency $\omega_0$, and thus the current Ia is composed predominantly of a sinusoidal component with the frequency $\omega_0$. In the device 40, the use of PR control having a high gain for variation with the frequency $\omega_0$ allows for the control that adjusts the difference to zero. Thus, the variation of the power supply bus voltage Vd can be reliably suppressed.

In order that the variation compensation circuit incorporating APD may reliably compensate for the power supply voltage variation, it is important to control the voltage of the auxiliary capacitor Cc so as to reduce the difference between the voltage of the auxiliary capacitor Cc and the target voltage. However, the voltage control of the auxiliary capacitor Cc is a non-linear model. The voltage of the auxiliary capacitor Cc is likely to oscillate if a typical existing control technique such as PI control is used for the voltage control of the auxiliary capacitor Cc.

In the device 40, the control circuit 42 controls the voltage Vc of the auxiliary capacitor Cc using the instantaneous active power ip in the variation compensation circuit. The active power in the variation compensation circuit is associated with charge and discharge of the auxiliary capacitor Cc. The use of the instantaneous active power in the variation compensation circuit for voltage control of the auxiliary capacitor Cc enables an existing control technique such as PI control to reliably control the voltage of the auxiliary capacitor Cc while suppressing oscillation. The device 40 can reliably suppress the variation of the voltage Vd of the power supply bus.

EXAMPLES

A power conversion device as shown in FIG. 6 was produced. A DC voltage source and an inverter were prepared as a power supply system for evaluation. The inventive device was connected to a power supply bus interposed between the DC voltage source and the inverter. A simulation environment for the inventive device and the power supply system was also prepared. The specifications of the inventive device (APD device) and the power supply system are shown in Table 1. As shown in Table 1, the total capacitance of the capacitors used in the inventive device is not more than 50 µF.

TABLE 1

Specifications for Evaluation

| | Item | Value |
|---|---|---|
| Power supply system | Inverter output power | 1 kW |
| | Inverter power factor | 1 |
| | Inverter output single-phase AC frequency | 50 Hz |
| | DC power supply bus voltage | 300 V |
| APD device | First capacitor C1 | 25.7 µF |
| | Second capacitor C2 | 3.5 µF |
| | Auxiliary capacitor Cc | 18.8 µF |
| | Inductors L1 + L2 | 200 µH |
| | FET turn-on resistance | 50 mΩ |
| | FET switching frequency | 100 kHz |

[Voltage Variation of Power Supply Bus]

Figure 7:
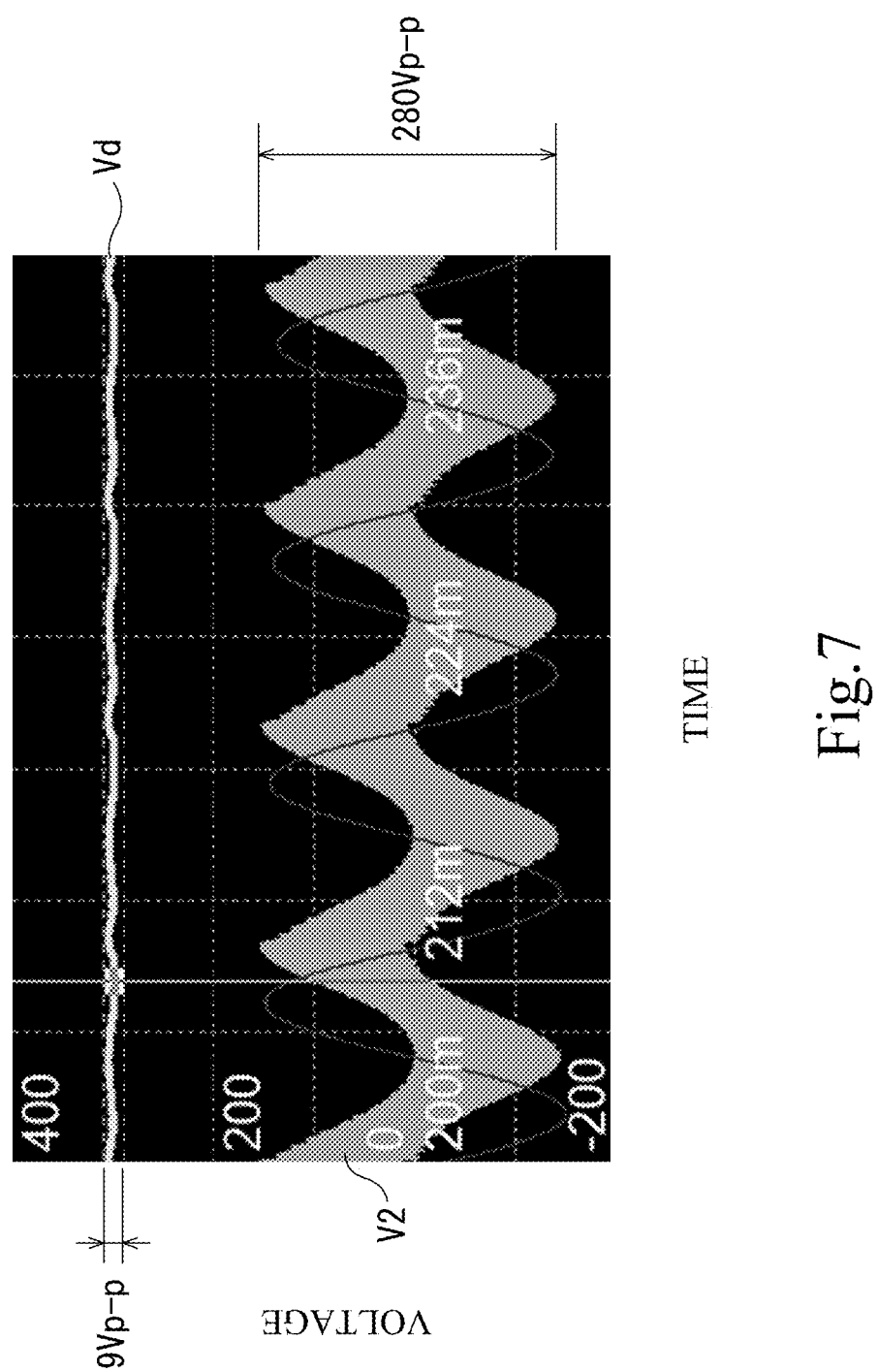
FIG. 7 is a graph showing a simulation result for control of power supply bus voltage by the device of FIG. 6.

A simulation was run to examine the voltage variation of the power supply bus during operation of the inverter. The result is shown in FIG. 7. In FIG. 7, the waveform of the voltage Vd of the power supply bus and the waveform of the voltage V2 of the second capacitor C2 are shown together. As shown in the figure, the voltage of the second capacitor C2 varied to compensate for the voltage variation of the power supply bus, and the peak-to-peak variation of the voltage of the second capacitor C2 was 280 V. Consequently, the peak-to-peak variation of the voltage Vd of the power supply bus was suppressed to 9 V. This result is comparable to that obtained when an electrolytic capacitor with a capacitance of 2 mF is connected to the power supply bus in place of the inventive device.

As seen from the foregoing description, the present invention makes it possible to reliably suppress voltage variation of a power supply bus by means of a low-capacitance capacitor. The present invention can provide a power conversion device able to suppress voltage variation of a power supply bus and having a small size and long service life. This clearly demonstrates the advantages of the present invention.

The power conversion device described above is applicable to a wide variety of power supply systems.

The foregoing description is given for illustrative purposes, and various modifications can be made without departing from the principles of the present invention.

What is claimed is:

1. A power conversion device that suppresses voltage variation of a direct-current power supply bus in a power system involving conversion between a single-phase alternating current and a direct current, the power conversion device comprising a variation compensation circuit and a control circuit,
wherein the variation compensation circuit includes:
a first capacitor connected to the power supply bus;
a second capacitor connected in series between the first capacitor and a ground;
an auxiliary capacitor;
a converter including a switching element and having a voltage step-down function, the converter being connected to the second capacitor and the auxiliary capacitor;
a first voltmeter that measures a voltage Vd of the power supply bus;
a second voltmeter that measures a voltage Vc of the auxiliary capacitor; and
an ammeter that measures an output current Ia of the converter,
wherein the control circuit receives the voltage Vd, the voltage Vc, and the current Ia as inputs, and generates a switch control signal for controlling turning on and off of the switching element to adjust the voltage Vd to a predetermined target voltage VD and the voltage Vc to a predetermined target voltage VC,
wherein the control circuit includes a proportional resonant control section having a peak gain for variation with a frequency wo which is twice a frequency of the single-phase alternating current, and
wherein the control circuit uses the proportional resonant control section to generate the switch control signal.

2. The power conversion device according to claim 1, wherein the proportional resonant control section has a peak gain for variation with a frequency which is an integral multiple of the frequency $\omega_0$.

3. The power conversion device according to claim 1, wherein the control circuit includes:
an IA determining section that determines an output current IA of the converter using the proportional resonant control section, the output current IA being for adjusting the voltage Vd to the target voltage VD;
a V2p determining section that determines a voltage V2p of the second capacitor, the voltage V2P being for adjusting the voltage Vc to the target voltage VC and the current Ia to the current IA; and
a switch control signal generating section that generates the switch control signal based on the voltage V2p and the voltage Vc.

4. The power conversion device according to claim 1, wherein the control circuit includes:
an IA determining section that determines an output current IA of the converter, the output current IA being for adjusting the voltage Vd to the target voltage VD and the voltage Vc to the target voltage VC;
a V2p determining section that determines a voltage V2p of the second capacitor using the proportional resonant control section, the voltage V2P being for adjusting the current Ia to the current IA; and
a switch control signal generating section that generates the switch control signal based on the voltage V2p and the voltage Vc.

5. The power conversion device according to claim 1, wherein the control circuit further includes an oscillation frequency component reducing circuit that reduces the amount of a component with an oscillation frequency which depends on the second capacitor and the converter,
wherein the current Ia coming from the variation compensation circuit is passed through the reducing circuit, and
wherein an output from the reducing circuit is used as the current Ia to generate the switch control signal.

6. The power conversion device according to claim 5, wherein the reducing circuit is a notch filter.

7. The power conversion device according to claim 1, wherein the converter is an inverter or a step-down chopper.

8. A method of controlling a variation compensation circuit for a power conversion device that suppresses voltage variation of a direct-current power supply bus in a power system involving conversion between a single-phase alternating current and a direct current, wherein the variation compensation circuit includes: a first capacitor connected to the power supply bus; a second capacitor connected in series between the first capacitor and a ground; an auxiliary capacitor; a converter including a switching element and having a voltage step-down function, the converter being connected to the second capacitor and the auxiliary capacitor; a first voltmeter that measures a voltage Vd of the power supply bus; a second voltmeter that measures a voltage Vc of the auxiliary capacitor; and an ammeter that measures an output current Ia of the converter, the method comprising the steps of:

(A) receiving the voltage Vd, the voltage Vc, and the current Ia as inputs; and (B) generating a switch control signal for controlling turning on and off of the switching element to adjust the voltage Vd to a predetermined target voltage VD and the voltage Vc to a predetermined target voltage VC, wherein in the step (B), proportional resonant control is performed, and the proportional resonant control has a peak gain for variation with a frequency wo which is twice a frequency of the single-phase alternating current.

9. The method according to claim 8, wherein the proportional resonant control performed in the step (B) has a peak gain for variation with a frequency which is an integral multiple of the frequency $\omega_0$.

10. The method according to claim 8, wherein the step (B) includes the steps of:

(B1) determining an output current IA of the converter by the proportional resonant control, the output current IA being for adjusting the voltage Vd to the target voltage VD;

(B2) determining a voltage V2p of the second capacitor, the voltage V2p being for adjusting the voltage Vc to the target voltage VC and the current Ia to the current IA; and (B3) generating the switch control signal based on the voltage V2p and the voltage Vc.

11. The method according to claim 8, wherein the step (B) includes the steps of:

(B1') determining an output current IA of the converter, the output current IA being for adjusting the voltage Vd to the target voltage VD and the voltage Vc to the target voltage VC;

(B2') determining a voltage V2p of the second capacitor by the proportional resonant control, the voltage V2p being for adjusting the current Ia to the current IA; and (B3') generating the switch control signal based on the voltage V2p and the voltage Vc.

12. The method according to claim 8, further comprising the step of:

(C) after receiving the current Ia as an input in the step (A), passing the received current Ia through an oscillation frequency component reducing circuit that reduces the amount of a component with an oscillation frequency which depends on the second capacitor and the converter, wherein in the step (B), the current passed through the reducing circuit is used as the current Ia.

13. The method according to claim 12, wherein the oscillation frequency component reducing circuit is a notch filter.

* * * * *